United States Patent Office 3,579,730
Patented May 25, 1971

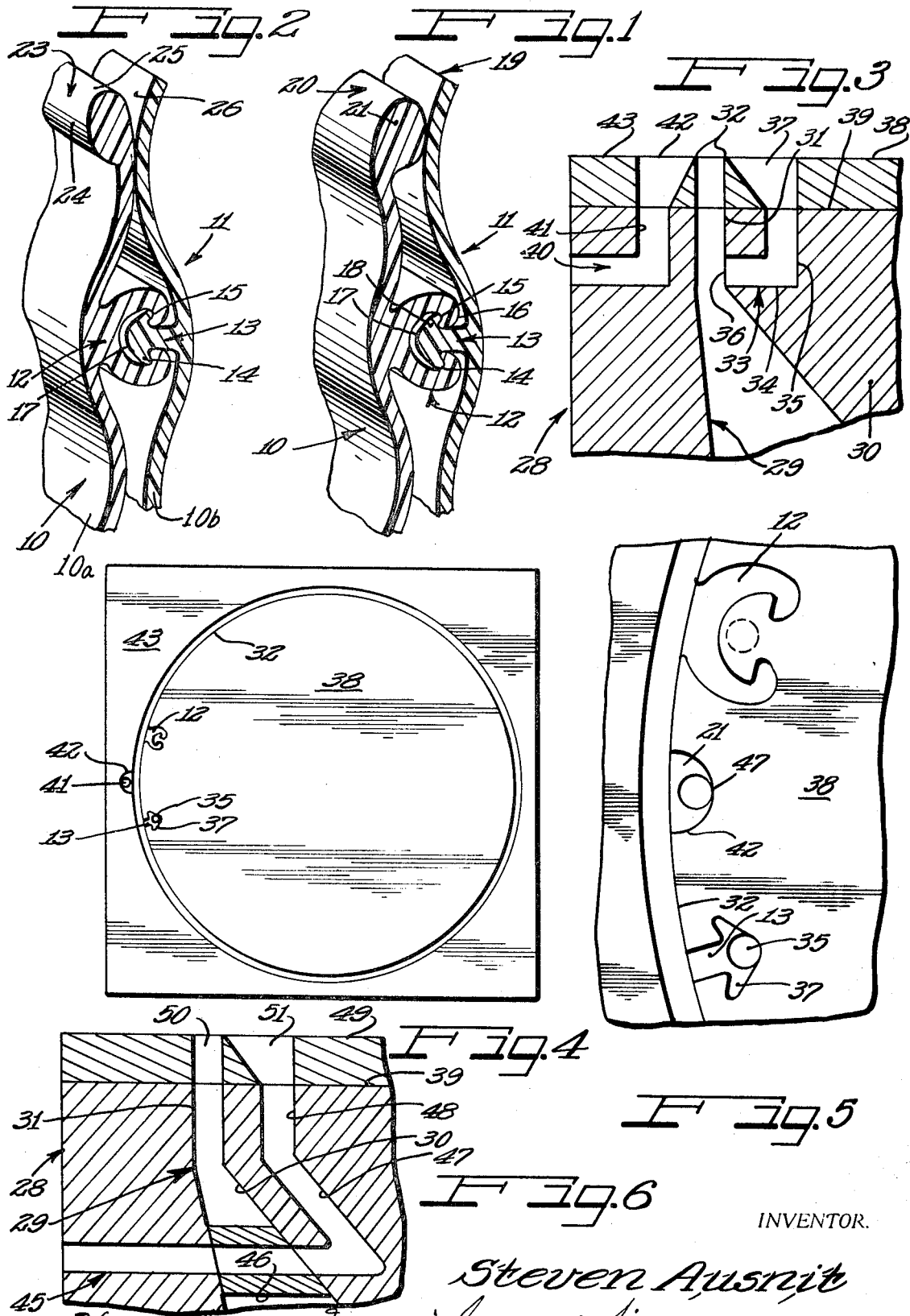

3,579,730
APPARATUS FOR MAKING A WEB HAVING INTEGRAL INTERLOCKING RIB AND GROOVE PORTIONS
Steven Ausnit, 134 E. 61st St., New York, N.Y. 10021
Original application Oct. 22, 1965, Ser. No. 500,562, now Patent No. 3,371,696, dated Mar. 5, 1968. Divided and this application Feb. 2, 1968, Ser. No. 702,586
Int. Cl. B29f 3/04
U.S. Cl. 18—12                                      10 Claims

ABSTRACT OF THE DISCLOSURE

An apparatus for making reclosable bags having a first extruder channel for extruding a first thermoplastic substance and having a series of minor extrusion channels for extruding a second thermoplastic substance such that interlocking rib and groove elements of a flexible reclosable container may be formed separately, yet integrally with the film forming the closure strips or walls of the container.

This application is a division of my copending application Ser. No. 500,652, filed Oct. 22, 1965, now Pat. No. 3,371,696.

BACKGROUND OF THE INVENTION

Field of the invention

The field of art to which this invention pertains is a device for forming flexible reclosable containers and in particular for forming interlocking rib and groove elements integrally with a film material having different thermoplastic properties from the interlocking rib and groove elements.

SUMMARY

It is an important feature of the present invention to provide and improved device for forming interlocking rib and grove elements on a flexible reclosable container.

It is another feature of the present invention to provide a device for forming interlocking rib and groove elements integrally on a film material wherein the interlocking rib and groove elements are formed of a thermoplastic substance having separate thermoplastic characteristics.

It is an object of the present invention to provide a device for developing a raised member of a resilient type fastener which is formed integrally with the fastener closure strips and which is formed of a thermoplastic substance having distinct qualities therefrom.

It is also an object of this invention to provide a device for forming interlocking rib and groove elements of a first thermoplastic substance directly on and integrally with a film constructed of a second thermoplastic substance.

These and other objects, features and advantages of the present invention will be understood in greater detail from the following description and the associated drawings wherein reference numerals are utilized in designating an illustrative embodiment.

BRIEF DECRIPTION OF THE DRAWINGS

FIG. 1 is an isometric partially sectioned view showing a flexible closure strip and the associated interlocking elements and illustrating the positioning of a spacer bead formed at the upper extremity of a grip flange;

FIG. 2 is a partially sectioned isometric view similar to that shown in FIG. 1 for illustrating a different positioning of the raised bead provided at the upper extremity of the grip flange;

FIG. 3 is a sectional view of a device used for developing the raised members of the flexible closure elements shown in FIGS. 1 and 2;

FIG. 4 is a top view of the device shown in FIG. 3 for illustrating the relative positioning of the indicated dies;

FIG. 5 is a top view of a device similar to that shown in FIG. 4 and having an alternate arrangement of the respective dies; and FIG. 6 is a sectioned view of, a die having a separate channel for developing the interlocking rib and groove element of a different thermoplastic substance from the sheeting to which it is attached.

DESCRIPTION OF THE PREFERRED EMBODIMENT

A flexible closure strip embodying the invention as shown in FIGS. 1 and 2 and includes webs 10A and 10B of a plastic film, interlocking closure elements (a groove element 12 and a web element 13), grip flanges (19 and 20) which are integral extensions of the webs, and a spacer bead 23. The flexible closure strip per se may be formed separately and atached integrally to the body of the pouch or associated container, or, in the alternative, the flexible closure strip may be an integral portion of a continuous thermoplastic film which when slit and shaped will comprise a pouch or container having the indicated fasterner elements disposed at the opening thereof.

Providing a flexible closure strip, in effect, means providing raised elements on a thin continuous film surface. While the raised elements are usually formed integrally with the supporting film structure, it has become highly desirable to construct the raised elements of a thermoplastic substance having different qualities from the of the supporting film, though still integral therewith.

For instance, the raised elements and the supporting film may have a distinct and different melt index or may involve specialized slip qualities. In addition, the gel of the raised elements may be desirably distinguishable from those of the film structure. As used in this context, melt index refers to the flow quality of the thermoplastic substance when subjected to a given force at a given temperature. The slip quality refers to the lubricity of the thermoplastic substance and is important to the extrudability characteristic. Gel is an indirect reference to the rigidity of the thermoplastic substance; gel also affects the clarity of the thermoplastic material.

It is apparent, therefore, that to accomplish different desirable objective of both the film and raised element features of a flexible closure strip, means must be provided to form raised elements and film supporting structures which have different qualities and which are formed integrally.

An example of the novel structure of this invention is shown generally in FIGS. 1 and 2 wherein a raised bead is provided at a grip flange for improving the accessibility of the pouch opening. In FIG. 1 the flexible closure strips 10 and 11 have walls or webs 10A and 10B of plastic film which are provided with interlocking rib and groove elements 12 and 13 formed at the inner surface thereof and being integral therewith. In standard manner, the rib element 13 is provided with overhanging ridges 14 and 15 which will readily deform upon a pressure applied inwardly of the closure strips 10 and 11. This deformation occurs at the restricted groove opening 16 of the groove element 12. Once the rib element penetrates the opening 16 and is received within an enlarged cavity 17, the deformed member assumes its unrestrained configuration and becomes locked therein at undercut engaging surfaces 18.

The interlocking rib and groove elements may be reopened or unlocked by the provision of upwardly extending grip flanges 19 and 20 which are integral extensions of the webs 10A and 10B. By urging the flanges 19 and 20 outwardly of the pouch enclosure, the rib and groove elements may be unlocked by peeling apart from the locked position shown in FIG. 1. This unlocking function occurs due to the direction in which the resulting force from the grip flanges is directed to the respective rib and groove elements.

However, it can be appreciated that due to the comparatively thin thermoplastic substance used for making the flanges 19 and 20, and also due to the adhesive nature of smooth surfaces and in particular of thermoplastic surfaces, the demarcation between the flanges 19 and 20, which must be grasped for opening the fastener elements, can be indistinguishable either to the sight or touch. To avoid this consequence, one of the flanges 19 or 20 may extend above the opposing flange for the purpose of emphasizing the point of opening. This remedy, however, has not been entirely successful, and this invention employs a specialized resilient bead 21 longitudinally at the upper extremity of the grip flange 20 for improving the accessibility of the flanges and hence of the pouch or associated container.

The bead 21 is formed integrally with the flange 20 and has a rounded face 22 which extends inwardly of the associated flanges. This inward extension of the bead 22 holds the opposite flange 19 spaced from the inner surface of the flange 20. Also, the rounded face 22 provides a minimum contact area between the respective flanges for reducing the adhesive effects of the thermoplastic substance.

The size and positioning of the bead 21 at the inner surface of the flange 20 is not arbitrary. For instance, by moving the bead 21 closer to the interlocking rib and groove elements and by providing the rounded surface 22 to be sufficiently elevated from the face of the flange 20, an obstacle may be presented to the locking of the interlocking elements. In particular, the spreading of the flanges either purposely or with the elevated face 22 can reduce the locking qualities of the associated fastener elements.

In contrast, by providing the rounded surface 22 to be insufficiently elevated from the inner face of the grip flange 20 the effectiveness of the spacing function associated with the bead 21 will be greatly reduced. In addition, spacing the bead 21 by a sufficient distance from the region of the interlocking elements reduces the spreading effect and hence eliminates the possibility of accidental and undesirable opening of the pouch. Therefore, the size and positioning of the bead 21 is related to the size and configuration of the interlocking structure to which it pertains.

FIG. 2 shows a flexible closure assembly substantially equivalent to that illustrated in FIG. 1 with the exception that a raised surface in the form of a bead 23 is disposed at the outer surface of the grip flange 20. Unlike the example of FIG. 1, the raised bead of FIG. 2 does not provide a spacer function for spreading the grip flanges 19 and 20. However, the raised bead 23 does provide a function which is identical to a function associated with the raised bead 21 of FIG. 1. That function is that the raised beads 22 and 23 both provide means for improving the accessibility of the grip flanges and of the associated pouch or container.

In FIG. 2 this improved accessibility is achieved from the positioning of the raised bead 23 at the upper extremity of the grip flange 20. In particular, the raised bead 23 is provided with a rounded face 24 which tapers to the upper edge 25 of the flange 20. Also, the opposing grip flange 19 extends above the flange 20 and hence above the raised bead 23 to improve the opening process.

The added accessibility derives from the fact that by placing the thumb at the curved surface 24 and sliding the thumbnail upward, the edge 25 is clearly distinguishable against the inner facing 26 of the grip flange 19. Therefore, the raised surface 24 of the bead 23, together with the upwardly extending portion of the grip flange 19, cooperates to provide a means for gaining ready accessibility to the separate flanges and for opening the associated interlocking fastener elements.

FIGS. 3 through 6 show devices and illustrate methods for developing the raised elements as disclosed in FIGS. 1 and 2 at the surface of the flexible closure strips.

In FIG. 3 an extruder feeds a die body 28 which is provided with a main flow channel 29 comprising tapered wall portions 30 and straight wall portions 31 and opposing wall portion 31A. The straight wall portions 31 and 31A define an outlet 32 which is used to form the film on the flexible closure supporting structure. The opening 32 at the upper surface of the die body 28 may be, for example, as narrow as .006 of an inch or less, in order to yield a film of a thickness as low as .001.

Assuming in this particular example, that the rib and groove elements as shown in FIGS. 1 and 2 are to be constructed of a thermoplastic substance identical to the thermoplastic material used to form the film structure, the device of FIG. 3 provides a tributary channel 33 consisting of a right angle leg 34 and a parallel passage 35. The right angle passage 34 conducts from an opening 36 formed at the main channel 29 and the parallel passageway 35 conducts to a die opening 37 formed within a die plate 38 which is mounted at the upper surface 39 of the die body 28.

To provide the bead structure as shown in FIG. 2, the die body 28 is provided with a separate and distinct flow channel 40 which conducts from a source, another thermoplastic substance having qualities which differentiate from the substance carried through the main channel 29. The thermoplastic substance associated with the separate channel 40 is carried to a vertical leg 41 and to a die opening 42 formed within a die plate 43. The die plate 43, like the plate 38, is mounted securely at the upper surface 39 of the die body 28.

In FIG. 4, the top view of the die plates 38 and 43 illustrate the relative positioning of the interlocking die structures and the association of the bead die with that of the main channel 29. It is apparent that the device of FIG. 4 is related to the structure shown in FIG. 2 in that the bead die is formed across the channel 29 opposite the cooperable interlocking members. It is also apparent that the raised members of the fastener structure are formed on the pouch or container film directly which may be extruded through a circular type main channel.

FIG. 5 is a top view of a device similar to that shown in FIG. 3 which has the bead die formed on the same side of the principal channel 29 as the interlocking rib and groove members. This is the device utilized for developing the structure of FIG. 1 wherein the raised bead provides a spacer surface between the associated grip flanges. This is in contrast to the example of FIG. 2 wherein the raised bead provides a thumbnail surface to improve the accessibility of the flange opening.

In FIG. 6, a die body is shown having features similar to that illustrated in FIG. 3 with the added feature of a means for forming the interlocking rib and groove elements of a thermoplastic substance which has distinctive features which distinguish the similar features of the film structure. In particular, the die body 28 has a separate channel 45 which crosses the main channel within a connector sleeve 46 which connects the central part of the die body to the outer part of the die body. The channel 45 extends through an elongated parallel passage 47 to the vicinity 48 of a die plate 49.

The main channel 29 carries the thermoplastic material, which forms the structural film of the pouch, past and around the connector sleeve or bridge member 46 to the narrow extruder opening 50. Simultaneously, the flow of a second thermoplastic substance through the separate passageway 45 develops the interlocking rib and groove elements within the die 51 and merges with the flow of the first thermoplastic substance after it passes through the extruder outlet 50 at the extruder opening or outlet 50.

In this way, the interlocking rib and groove elements can be provided simply and efficiently to have specialized properties distinct from properties of the film structure and which are formed integrally with that structure.

By using separate channels, a resin with sufficient rigidity for greater strength can be directed at the interlocking elements, while a resin with greater clarity for the best optical properties can be directed at the film. Since thes properties are usually not found in the same resin, this avoids the necessity of a compromised resin which would have only part of the desired properties for each part of the structure. For example, it has been found that the best suited resin for a profile construction will give a completly milky appearance when applied to a film, making the film relatively opaque.

By using separate channels it is also possible to impart a greater slip factor to the interlocking elements than to the film structure. This is desirable since greater slip makes possible easier opening and closing of the interlocking elements, which slip, if imparted to the film structure, makes the finished pouches produced thereof very slippery and difficult to handle.

Another advantage in separating the interlocking element material from that of the film structure is that of being able to impart (especially when combined with greater slip as mentioned above) a greater stiffness to these elements. This means that the interlocking elements can be made smaller and hence use up less raw material and hence make the whole structure more economical.

Yet another advantage fo separating the resin channels is that of being able to give to each resin a diffreent elongation factor. For example, it is desirable for the film structure to stretch more and at a greater speed than the interlocking elements. This is because the interlocking elements are complicated profiles that can be distorted by too fast stretching, since they do not stretch uniformly as does the film.

Therefore, it will be seen from the above examples that by separting the necessary channels and providing one resin for the interlocking elements and another resin for the film structure, and by joining these at the die plate aperture, it is possible to obtain optimum physical characteristics for each without having to compromise one set of such characteristics with the other.

The provision for a separate channel to extrude special properties for the interlocking rib and groove elements can be incorporated into the die of FIG. 3 or may be used separately for other purposes apart from the implications of FIG. 3.

It will be understood that various modifications may be suggested by the embodiments disclosed, but I desire to claim within the scope of the patent warranted hereon all such modifications as come within the scope of my invention.

I claim as my invention:

1. A mechanism for making a sheet with integral flexible pressure interlocking rib and groove elements thereon, comprising:
   a die body having a main channel formed therein for extruding a film therethrough,
   means defining a scond channel in said die body shaped to form a groove element,
   means defining a third channel in said die body shaped to form a rib element of a size and shape to releasably pressure interlock with the groove element.
   and openings in said die body for each of said channels positioned so that said rib and groove elements will be attached to the film after it has emerged from the die opening.

2. A mechanism in accordance with claim 1 wherein the openings of the die body are positioned so that the rib and groove elements attach to the film immediately as it emerges from the opening.

3. A mechanism in accordance with claim 1 wherein means are provided to supply plastic to said second and third channels of a physical characteristic different than the plastic supplied to the main channel so that the rib end groove elements may be formed of a plastic having a physical characteristic different than that of the film.

4. An apparatus for developing a sheet with an integral flexible closure strip having a web and interlocking rib and groove elements thereon, comprising:
   a die body having a main channel formed therein for extruding a film therethrough to form said web,
   a first die plate disposed at said die body,
   said main channel conducting from a source of a first thermoplastic substance to said first die plate,
   a separate channel formed within said die body shaped for extruding an interlocking element,
   a second die plate disposed at said die body,
   said separate channel conducting from a source of a second thermoplastic substance to said second die plate,
   the outermost extremity of said second die plate coacting with the outermost extremity of said first die plate for joining the film and said interlocking element.

5. An apparatus for developing a sheet with an integral flexible closure strip having a web and interlocking rib and groove elements thereon comprising:
   a die opening formed at said face and spaced from extruding a film therethrough to form said web,
   said die body having a face,
   an elongated opening formed at said face,
   said main channel conducting from a source of a first thermoplastic substance to said elongated opening, a separate channel formed within said die body shaped to form an interlocking element,
   a die opening formed at said face and spaced from said elongated opening,
   said separate channel conducting from a source of a second thermoplastic substance to said die opening,
   a die plate disposed at said face and having ports therein for forming, in conjunction with said elongated opening, a film of said first thermoplastic substance and for forming, in conjunction with said die opening, an interlocking element on the surface of said film and integral therewith of said second thermoplastic substance.

6. An apparatus for developing a sheet with an integral flexible closure strip having a web and interlocking rib and groove element thereon comprising:
   a die body having a main channel formed therein for extruding a film therethrough,
   said die body having a plant face thereof,
   an elongated opening formed at said plane face,
   said main channel conducting from a source of a first thermoplastic substance to said elongated opening,
   a first die opening formed at said plane face,
   a tributary channel conducting from said main channel to said first die opening,
   a separate channel formed within said die body,
   a second die opening formed at said plane face and spaced from said elongated opening,
   said separate channel conducting from a source of a second thermoplastic substance to said second die opening,
   a die plate disposed at said plane face and having a port formed therein for forming, in conjunction with said elongated opening and said first die opening,
   a film and interlocking elements thereon of said first thermoplastic substance and for forming, in conjunction with said second die opening, a raised bead on said film of said second thermoplastic substance.

7. An apparatus for developing a sheet with an integral flexible closure strip having a web and interlocking rib and groove elements thereon, comprising:
   a die body having a main channel formed therein for extruding a film therethrough,
   said die body having a face thereof, an elongated opening formed at said face,
said main channel conducting from a source of a first thermoplastic substance to said elongated opening,
first and second die openings formed at said face at a first side of said main channel,
tributary channels conducting from said main channel to said first and second die openings,
a separate channel formed within said die body,
a third die opening formed at said face at a second side of said main channel and spaced from said elongated opening,
said separate channel conducting from a source of a second thermoplastic substance to said third die opening,
a die plate disposed at said face and having a port formed therein for forming, in conjunction with said elongated opening and said first and second die openings, a film and interlocking elements thereon of said first thermoplastic substance and for forming, in conjunction with said third die opening, a raised bead on said film of said second thermoplastic substance.

8. A device for making a sheet with an integral flexible closure strip including a web, and interlocking rib and groove elements and a spacer bead thereon, comprising:
a die body having a main channel formed therein for extruding a film therethrough,
first and second die channels conducting from said main channel for forming said interlocking elements at a first side of said film,
a third die channel formed separately within said die body for applying said spacer bead to a second side of said film,
said third die channel disposed between said first and second die channels at the opposite side of said main channel and spaced closer to one of said first and second die channels.

9. A device for making a sheet with an integral flexible closure strip including a web, and interlocking rib and groove elements and a spacer bead thereon, comprising:
a die body having a main channel formed therein for extruding a film therethrough,
first and second die channels conducting from said main channel for diverting thermoplastic material therefrom,
a third die channel formed separately within said die body,
first and second dies disposed at the outlet of said first and second die channels for forming said interlocking elements therein,
a third die disposed at the outlet of said third die channel for forming said spacer bead therein,
said first and second dies disposed at a first side of said main channel and said third die disposed at a second side of said main channel between said first and second dies.

10. In a device for making a flexible closure strip as defined in claim 9 wherein said third die is disposed at said first side of said main channel.

References Cited
UNITED STATES PATENTS

| | | | |
|---|---|---|---|
| 1,661,069 | 2/1928 | Hartung | 18—12X |
| 1,814,820 | 7/1931 | Boswell. | |
| 2,125,001 | 7/1938 | Cowen et al. | |
| 2,683,897 | 7/1954 | Patterson | 18—12X |
| 2,968,835 | 1/1961 | Weston et al. | 18—12 |
| 3,038,205 | 6/1962 | Plummer | 18—12X |
| 3,195,184 | 7/1965 | Svec. | |
| 3,418,685 | 12/1968 | Anderson | 18—12X |
| 3,394,433 | 7/1968 | Houvener | 18—12X |

J. SPENCER OVERHOLSER, Primary Examiner
R. S. ANNEAR, Assistant Examiner

UNITED STATES PATENT OFFICE
CERTIFICATE OF CORRECTION

Patent No. 3,579,730          Dated May 25, 1971

Inventor(s) Steven Ausnit

It is certified that error appears in the above-identified patent and that said Letters Patent are hereby corrected as shown below:

In the specification:

Col. 1, line 40, "and" should be --an--.
    Col. 2, line 33, "the" should be --that--.
    Col. 5, line 9, "thes" should be --these--.
    Col. 5, line 14, "completly" should be --completely--.
    Col. 5, line 31, "diffreent" should be --different--.
    Col. 5, line 39, "separting" should be --separating--.
    Col. 6, line 26, "a die opening formed at said face and spaced from" should read -- "a die body having a main channel formed therein for--.
    Col. 6, line 50, "plant" should be --plane--.

Signed and sealed this 21st day of March 1972.

(SEAL)
Attest:

EDWARD M. FLETCHER, JR.
Attesting Officer

ROBERT GOTTSCHALK
Commissioner of Patents